United States Patent [19]

Christopher et al.

[11] Patent Number: 5,402,528
[45] Date of Patent: Mar. 28, 1995

[54] RECONFIGURABLE PRINTER

[75] Inventors: Amy S. Christopher, Centerville; Donald A. Morrison, Dayton; Richard D. Wirrig, Huber Heights; Ruth A. Luff; Mark W. Roth, both of Miamisburg, all of Ohio

[73] Assignee: Monarch Marking Systems, Inc., Miamisburg, Ohio

[21] Appl. No.: 447,364

[22] Filed: Dec. 7, 1989

Related U.S. Application Data

[63] Continuation-in-part of Ser. No. 209,945, Jun. 22, 1988.

[51] Int. Cl.[6] .............................................. G06K 15/00
[52] U.S. Cl. ..................................................... 395/109
[58] Field of Search .................. 364/519, 518; 400/63, 400/83; 340/747, 750, 798, 794; 395/109, 165, 155, 162, 163, 164; 345/115, 116

[56] References Cited

U.S. PATENT DOCUMENTS

| | | | |
|---|---|---|---|
| 4,435,765 | 3/1984 | Uchida et al. | 364/200 |
| 4,564,301 | 1/1986 | Ueno | 406/63 |
| 4,931,957 | 6/1990 | Takagi et al. | 364/521 |
| 4,943,936 | 7/1990 | Hirai et al. | 364/519 |
| 4,964,067 | 10/1990 | Honickman et al. | 364/520 |
| 4,985,850 | 1/1991 | Okamoto | 364/519 |
| 5,043,713 | 8/1991 | Katsura et al. | 340/747 |

FOREIGN PATENT DOCUMENTS

| | | |
|---|---|---|
| 1286786 | 7/1991 | Canada . |
| 241678 | 10/1987 | European Pat. Off. . |
| 87021128 | 3/1988 | WIPO ............................. G06F 3/12 |

Primary Examiner—Phu K. Nguyen
Attorney, Agent, or Firm—McAndrews, Held & Malloy

[57] ABSTRACT

A printer having a number of optional features or operations is reconfigurable by software alone. The printer includes an EPROM that stores the software routines defining all of the optional operations of the printer. An EEPROM stores a jump table identifying each optional operation software routine as enabled or disabled. The information stored in the jump table for each enabled routine identifies the location at which the routine is stored in the EPROM; whereas, the information stored for each disabled routine includes a disable flag. The printer includes an interface which allows a new jump table to be downloaded from a personal computer into the EEPROM of the printer to enable disabled routines, to disable enabled routines, and to replace disabled routines by downloading a new routine into a RAM to thereby reconfigure the printer. A master jump table and sub-jump tables are provided to increase the efficiency of the reconfiguring operation. Further, several checks are implemented by the printer and the personal computer during the reconfiguration operation to insure that only the correct printer is reconfigured and that information is stored at the proper location in the printer.

39 Claims, 9 Drawing Sheets

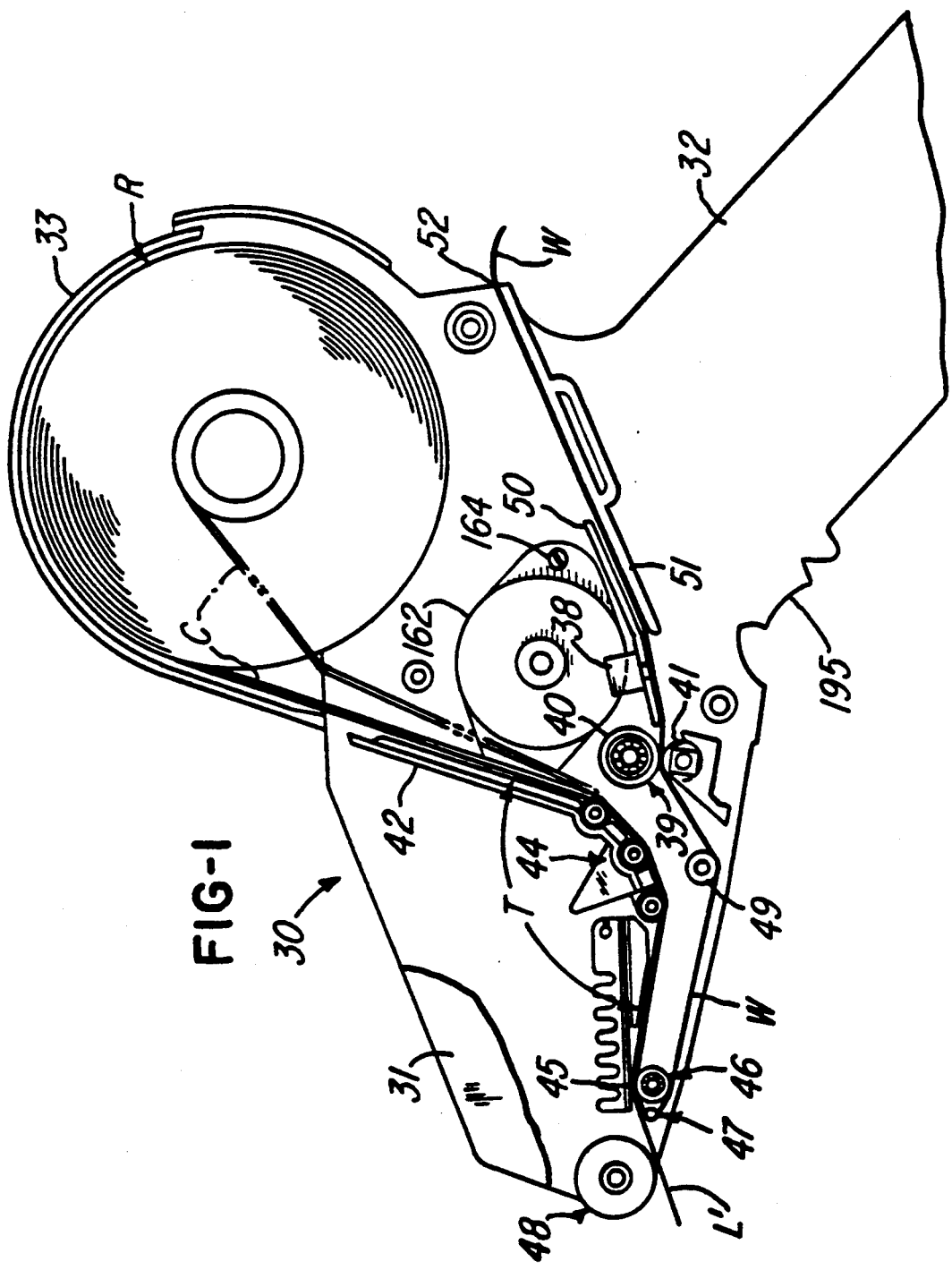

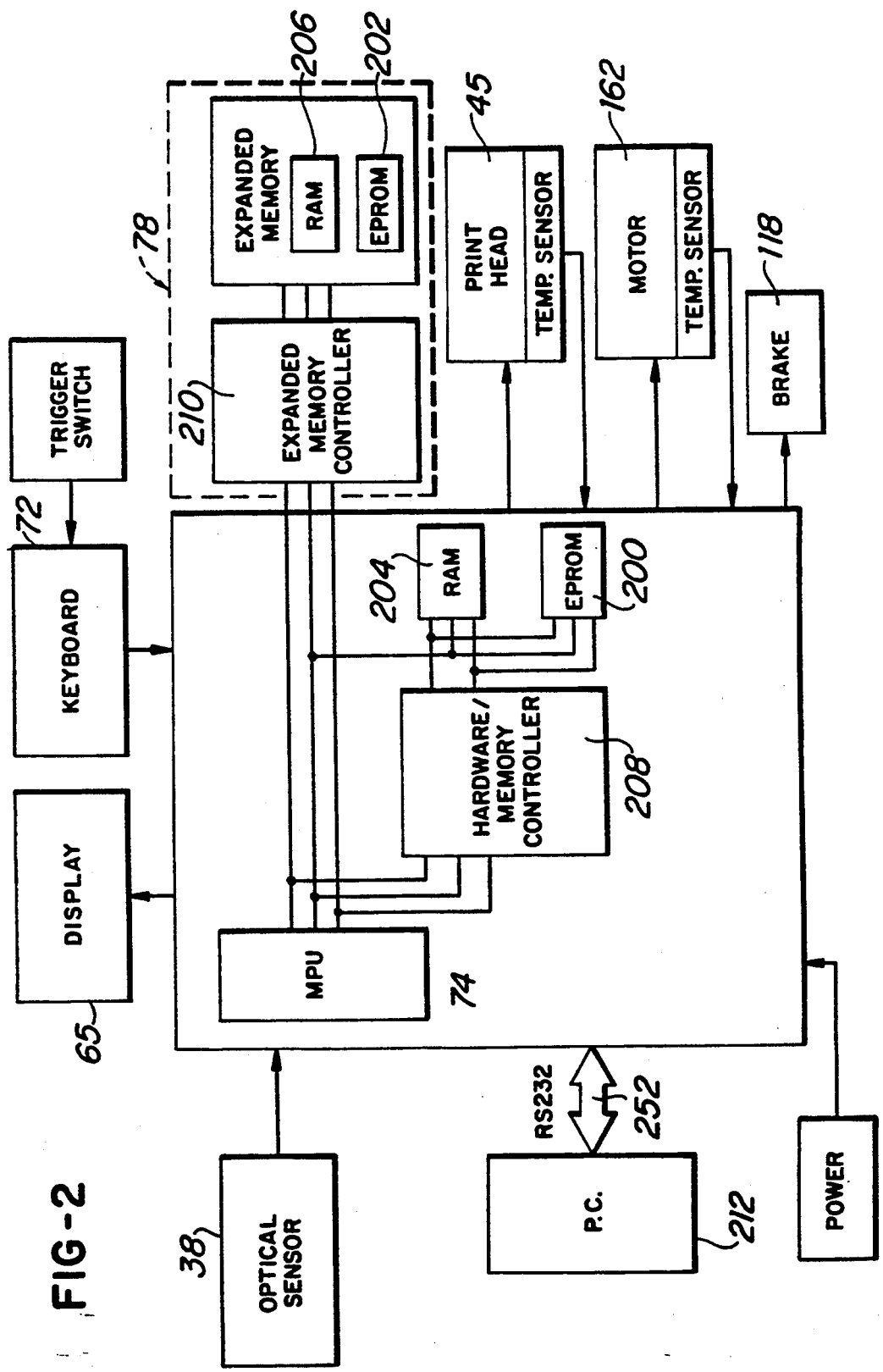

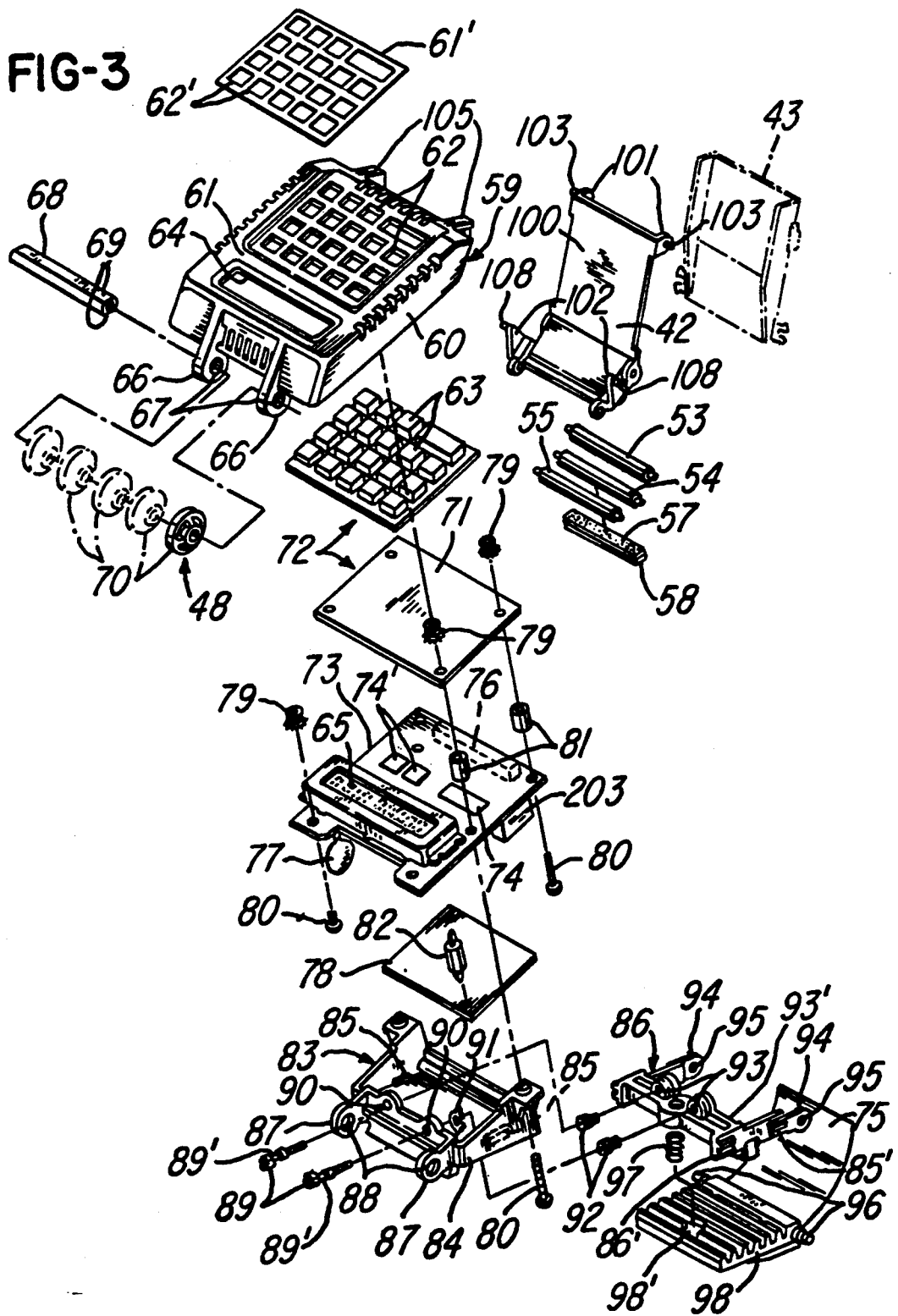

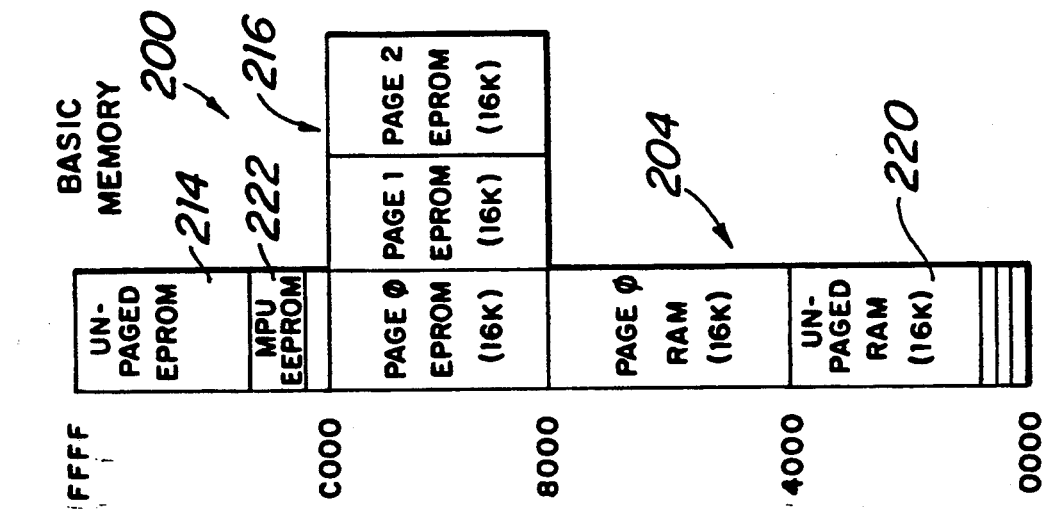

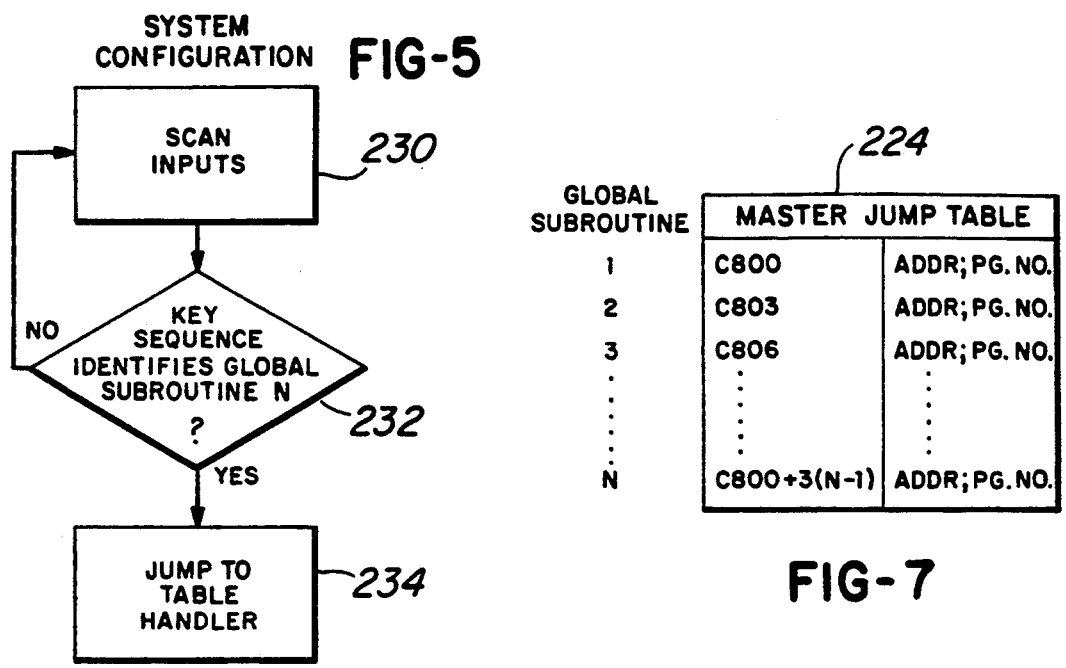
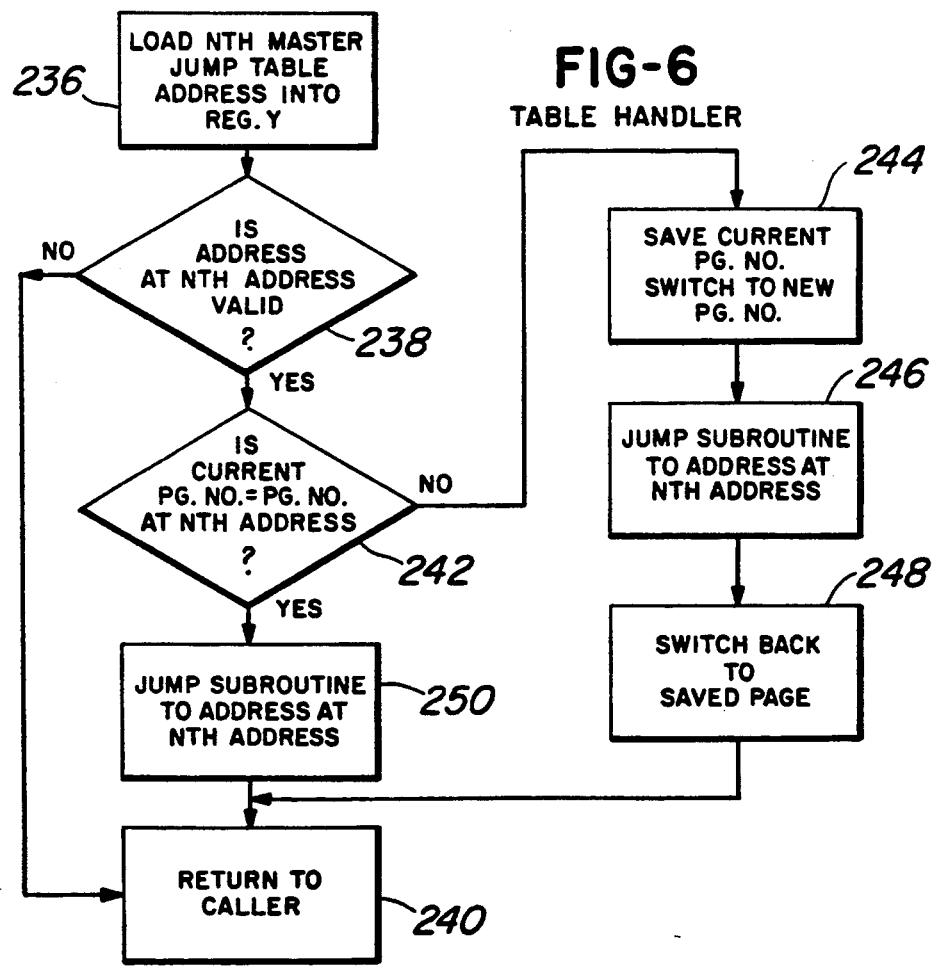

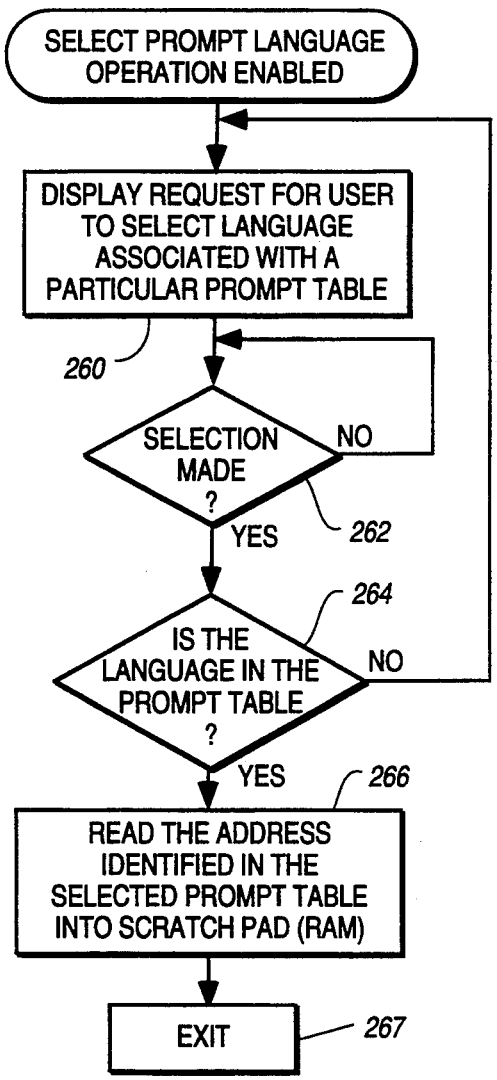
Fig. 8
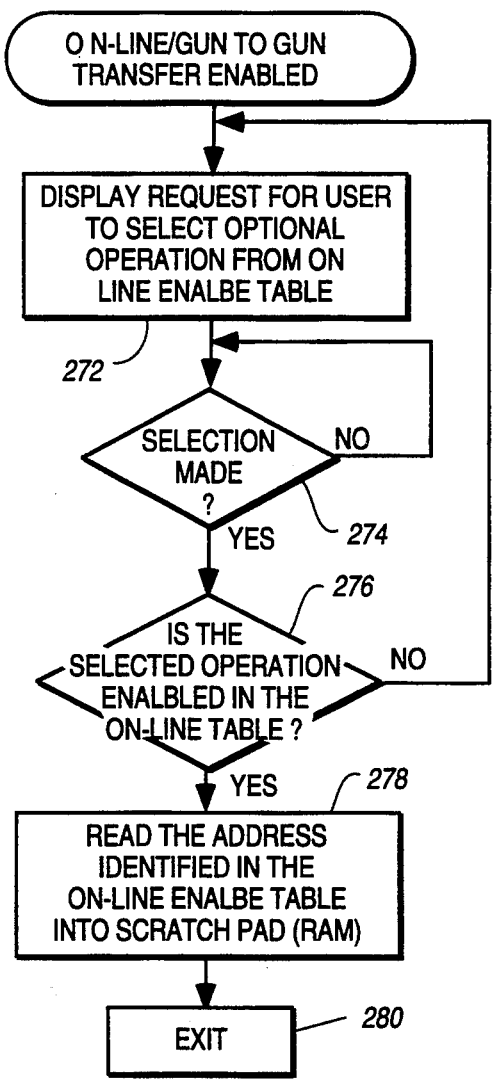
Fig. 9
Fig. 10
| INFORMATION \ OPERATION | UPLOAD | DOWNLOAD | GUN-TO-GUN |
|---|---|---|---|
| FORMATS | ENABLE/DISABLE | ENABLE/DISABLE | ENABLE/DISABLE |
| LABEL DATA | ENABLE/DISABLE | ENABLE/DISABLE | ENABLE/DISABLE |
| CHECK DIGITS | ENABLE/DISABLE | ENABLE/DISABLE | ENABLE/DISABLE |
| COST CODES | ENABLE/DISABLE | ENABLE/DISABLE | ENABLE/DISABLE |
| VENDOR NO. | ENABLE/DISABLE | ENABLE/DISABLE | ENABLE/DISABLE |

RECONFIGURABLE PRINTER

This is a continuation-in-part of application Ser. No. 209,945, filed Jun. 22, 1988.

TECHNICAL FIELD

The present invention relates to a printer for printing characters in various fonts and formats onto a web of record members and more particularly to such a printer that is processor controlled and has a number of optional features or operations that may be enabled or disabled to reconfigure the printer by software alone.

BACKGROUND OF THE INVENTION

Printers capable of printing characters in various fonts and formats onto a web of record members are known to include a microprocessor for controlling the operation of the printer. One such printer, a hand-held labeler, stores the software for controlling the operations of the printer in a read only memory such as an EPROM and stores the data to be printed on a label in a RAM. This known printer may be coupled to a host computer to change the data stored in the RAM using software alone, that is, by downloading new data from the host computer into the printer's RAM. However, in order to change the operations or available features of the printer as defined by the software stored in the EPROM, the printer must be disassembled, the EPROM removed and exposed to ultraviolet light to erase it and the EPROM reprogrammed using a specialized programmer module. The process of reconfiguring the printer by altering the software stored in the EPROM is both time consuming and costly.

SUMMARY OF THE INVENTION

In accordance with the present invention, the disadvantages of prior printers have been overcome. The printer of the present invention has a number of optional features or operations that may be enabled, disabled or replaced to reconfigure the printer by software alone.

More particularly, the printer of the present invention includes a first memory that is nonalterable by software alone for storing the software routines defining the optional features or operations of the printer. A second memory that is alterable by software alone stores a table with information therein identifying each optional operation software routine as enabled or disabled. The information stored for each enabled routine identifies the location at which the routine is stored in the first memory; whereas, the information stored for each disabled routine includes a disable flag.

An input device operable by a user, such as a keyboard, is provided to allow the user to select any one of a plurality of operations of the printer. The printer includes a microprocessor that is responsive to the input device for controlling the operations of the printer in accordance with the software defining a selected operation. The printer also includes means for interfacing the microprocessor control of the printer with a host computer or the like to allow the printer to be reconfigured by software alone; that is, by the downloading of a new table into the second memory to enable a previously disabled optional operation software routine, to disable a previously enabled optional operation software routine and to replace a disabled routine by downloading a new routine into a RAM.

Because the printer of the present invention may be reconfigured by software alone, the printer is extremely flexible. The printer may be reconfigured to add new features or to eliminate old features in a short amount of time and very inexpensively. Further, checks are performed to insure that the correct printer is reconfigured and that new data is not stored in a wrong location in the printer's memory.

These and other objects, advantages and novel features of the present invention, as well as details of an illustrated embodiment thereof, will be more fully understood from the following description and the drawing.

BRIEF DESCRIPTION OF THE DRAWING

FIG. 1 is a diagrammatic side elevational view of a printer in the form of a hand-held labeler in accordance with an embodiment of the present invention;

FIG. 2 is a block diagram of the labeler of FIG. 1;

FIG. 3 is an exploded perspective view of one section of the hand-held labeler of FIG. 1;

FIG. 4 is a map of the labeler's memory shown in FIG. 2;

FIG. 5 is a flow chart illustrating the system configurator subroutine of the labeler of the present invention;

FIG. 6 is a flow chart illustrating the table handler subroutine of the labeler of the present invention;

FIG. 7 is a chart illustrating the master jump table of the labeler of the present invention;

FIG. 8 is a flow chart illustrating a select prompt language routine;

FIG. 9 is a flow chart illustrating an on-line/gun-to-gun transfer routine;

FIG. 10 is a chart illustrating an on-line subtable;

DESCRIPTION OF THE PREFERRED EMBODIMENT

Figure 11:
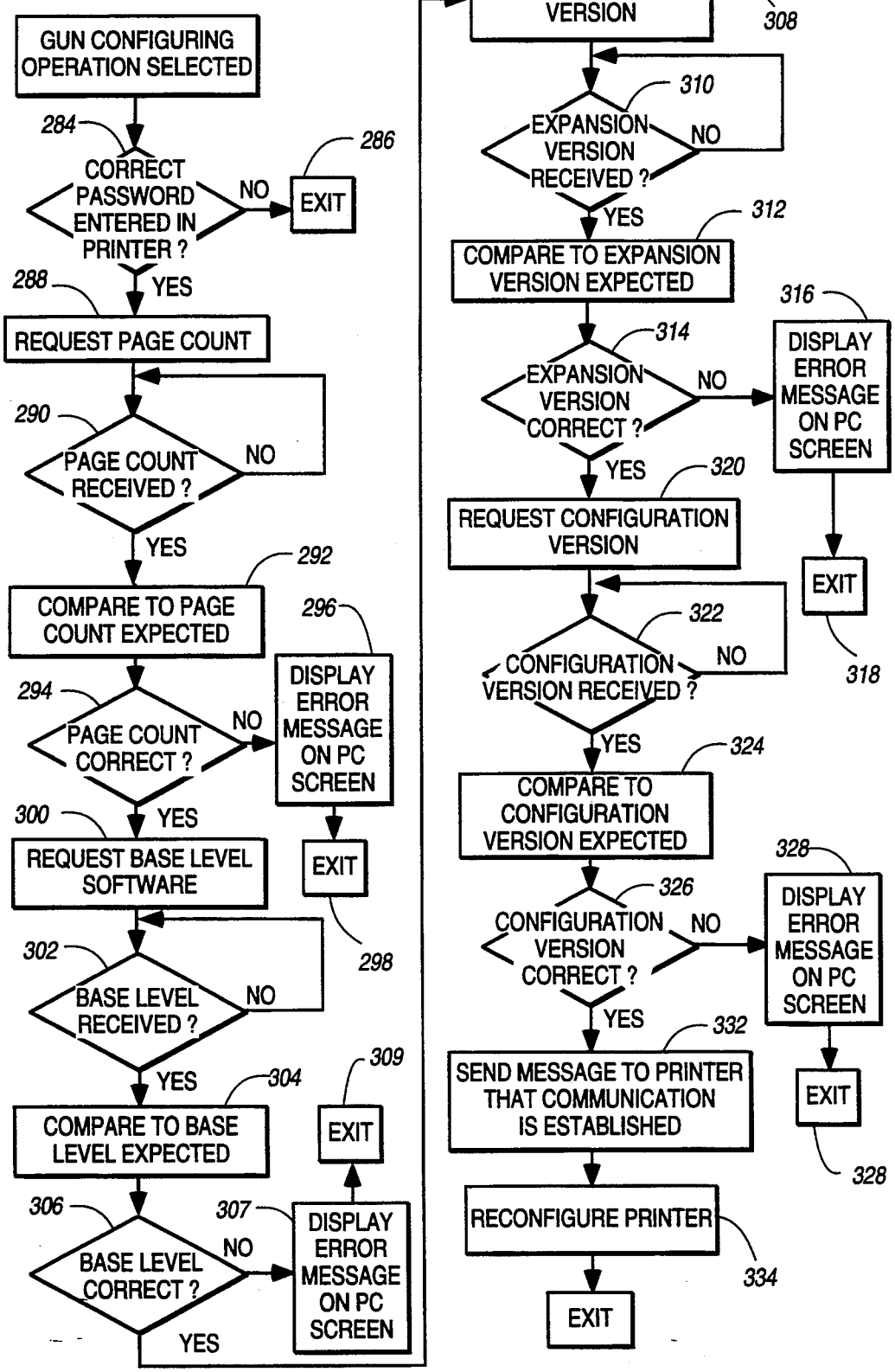
FIG. 11 is a flow chart illustrating a reconfiguring routine.

A printer employing the present invention is shown in FIG. 1 as a hand-held labeler generally indicated at 30. Although the present invention is described herein for the labeler 30, it is applicable to other types of printers that print characters in various fonts and formats onto a web of record members such as a table top printer that prints tags or the like, as shown in U.S. Pat. No. 4,442,774, incorporated herein by reference.

The labeler 30 as shown in FIG. 1 includes a frame or housing 31 having a handle 32. The housing 31 suitably mounts a label supply roll R. The roll R is shielded from ambient conditions, such as dust by a cover 33. The roll R is comprised of a composite label web C shown in both solid lines representing a full roll R, and phantom lines representing a nearly fully depleted roll R. The composite web C includes a carrier web W having a coating of release material such as silicone wherein the labels, such as label L', are releaseably secured to the carrier web W by a pressure sensitive adhesive. Solid, rectangular marks may be provided on the underside of the carrier web W for sensing by an optical sensor 38 in order to control various labeler functions and operations.

The composite label web C is payed out of the roll R when an advancing or feeding mechanism generally indicated at 39 is operated. The feeding mechanism 39 includes a resilient driving roll 40 and a cooperating serrated metal idler roll 41, wherein the driving roll 40 is coupled to and driven by an electric motor 162. The composite web C passes from the roll R to between a pair of spaced guides, only one of which is shown at 42. From there the composite web C makes a gradual transition as it passes about the guide 42. The guides 42 and a guide 44 define a path for the composite web C between the place where the composite web C is payed out of the roll R on the one hand, and a print head 45 and a cooperating platen generally indicated at 46 on the other hand. The print head 45 has a straight line of closely spaced print elements which extends perpendicular to the path of travel of the composite web C. The transition made by the composite web C is through an angle T not less than 85° and preferably about 96° assuming a full label supply roll R, and in addition, it is preferred that the radius R' of the path be not less than 18 mm and most preferably about 25 mm. A delaminator generally indicated at 47 includes a peel roller positioned closely adjacent the line of pressure contact between the print head 45 and the platen 46. The carrier web W passes partly about the delaminator 47 to effect delamination of the leading label L'. The leading label L' is dispensed into label applying relationship with respect to an applicator generally indicated at 48. From the delaminator 47 the carrier web W passes again into contact with the platen 46, and from there, partly about a guide roller 49 to between the neck of the rolls 40 and 41. The carrier web W has enough stiffness to be pushed along guides 50, 51 and 51' and to exit through an exit opening 52 in the housing 31 at a point above and behind the handle 32.

With reference to FIG. 3, there is shown a section generally indicated at 59 for mounting various components of the labeler 30. The section 59 helps to protect such components from damage and ambient contamination and can be considered to constitute an outer part of the housing 31, if desired. The section 59 is shown to include a generally box-like member 60 having a wall portion 61 with openings 62. Keypads 63 project through the openings 62, and an opening 64 receives a display 65. A grid-like sheet 61' has holes 62' aligned with the holes 62. The holes 61' receive the keypads 63. Different areas of the sheet 61' are color coded to avoid the need for color-coding the keypads 63. The member 60 has a pair of spaced tabs 66 with aligned holes 67 for receiving a shaft 68 having flats 69. The flats 69 key the shaft 68 to the housing 31 against rotation. The shaft 68 passes through a series of rotatable applicator rollers 70 which comprise the applicator 48. The section 59 can pivot about the shaft 68 between its normally closed or operative position to its open position.

The keypads 63 and a cooperating printed circuit board 71 constitute a keyboard generally indicated at 72. Another circuit board 73 mounts the display 65, a microprocessor 74 and various other electrical components 74' which are diagrammatically illustrated. The print head 45 is connected by a ribbon connector 75 to a plug-in type connector 76 which, in turn, is connected to the microprocessor 74. The printed circuit board 73 also mounts an auxiliary lithium battery 77 for powering the microprocessor 74 when other power to the microprocessor 74 is interrupted. Additional memory is contained in a printed circuit board 78. The printed circuit boards 71 and 73 are secured to the section 59 by fasteners 79 secured to the inside of the section 59 by screws 80 received by the fasteners 79 and by spacers 81. The printed circuit board 78 is secured at two places to the printed circuit board 73 by stand-offs 82 only one of which is shown.

A support generally indicated at 83 is shown to include a member 84 having spaced guides 85 for loosely and slidably guiding a mounting member generally indicated at 86. The guides 85 fit into oversized grooves 85' only one of which is shown The member 84 has spaced tabs 87 having aligned round holes 88 which receive the shaft 68. Two screws 80 secure the support 83 to the section 59. A pair of adjusting screws 89 pass through oversize holes 90 in the member 84, through C-rings 91 and are threadably received in threaded members 92 secured in holes 93 and the mounting member 86. The C-rings 91 are received in grooves 89' and the screws 89 to prevent shifting of the screws 89 axially of the holes 90. Because of the loose sliding fit between the members 84 and 86, rotation of the screws 92, or either one of them, can skew the member 86 to in turn bring the straight line of printing elements on the print head 45 into alignment with the axis of the platen roll 46. The mounting member 86 has a pair of spaced arms 94 with round holes 95 which receive aligned studs 96. A compression spring 97 acting on the member 86 midway between arms 94 and the metal heat sink 98 which mounts the print head 45, urges the print head 45 into pressure contact with the platen roll 46 along a line of contact. The spring 97 also enables the print head to yield to accommodate big labels. The spring 97 nests in a pocket in the mounting member 86 and in a pocket 98' in the heat sink 98. The print head mounting member 86 is preferably constructed from molded plastic material and is of generally U-shaped configuration. The member 86 is preferably relatively flexible and resilient and can twist to enable the print head 45 to compensate for variations between the print head 45 and platen roll 46 due, for example, to manufacturing variations. As shown, the arms 94 are parallel to each other but they can skew due to their flexible and resilient construction. Each arm 94 is joined to a bight portion 93'. Each arm 94 has a hook-like member 86' which snaps under the heat sink 98 to couple the mounting member 86 to the heat sink 98. The members 86' allow for limited movement between the member 86 and the heat sink 98 but prevent their separation. The guide 42 is shown in FIG. 3 to have a body 100 with a pair of tabs 101 at its one end portion and a pair of tabs 102 at its other end portion. The tabs 101 have studs 103 received in aligned holes and tabs 105 on member 60. The member 83 also has projections 106 having holes 107 for receiving studs 108 on tabs 102. The guide 42 is thus pivotal about studs 103 on the member 60, and by flexing the tabs 102 toward each other, the studs 108 can be aligned with and inserted into the holes 107 to retain the holder 56 in its operative position, where the tabs 102 can be flexed towards each other to enable the studs 108 to be withdrawn from the holes 107, to enable the holder 56 to be pivoted away to allow access to the printed circuit board 71, 73 and 78 for ease of access and disassembly.

The microprocessor 74, as shown in FIG. 2, is responsive to inputs from the optical sensor 38, the keyboard 72, a trigger switch 73, a print head temperature sensor 201, a motor temperature sensor 203 and in an on-line mode to a host computer 212 to control the operations of the labeler 30 in accordance with software and data respectively stored in EPROMs 200, 202 and RAMs 204, 206. The EPROM 200 and RAM 204 comprise the basic memory unit of the labeler 30; whereas, the EPROM 202 and the RAM 206 comprise the expanded memory of the labeler 30. The microprocessor 74 is coupled to the EPROM 200 and the RAM 204 through a hardware/memory controller 208 and is coupled to the EPROM 202 and the RAM 206 through an expanded memory controller 210, wherein the controllers 208 and 210 provide page control for the respective memories 200, 204 and 202, 206. The controller 208, in conjunction with the microprocessor 74 also controls the hardware of the labeler 30 such as the print head 45, the motor 162 and a brake 118.

The labeler 30 under the control of the microprocessor 74 is capable of performing a number of operations in accordance with the software stored in the EPROMs 200 and 202. Some of the operations that the labeler 30 is capable of performing are optional, in that they may be disabled or replaced by a host computer 212 coupled to the labeler 30 through an RS 232 interface 252 as discussed in detail below. Other operations of the labeler 30 are non-optional, in that they may not be disabled or replaced. Nonoptional operations of the labeler 30 are controlled by software stored in a kernel formed in an unpaged EPROM 214 (FIG. 4) extending from address C000 to FFFF of the EPROM 200, with the exception of addresses C800–CFFF which form the microprocessor EEPROM discussed in detail below. The non-optional labeler operations controlled by the software in the kernel EPROM 214, include operations such as the printing of characters on labels by the print head 45, the display of prompts and other messages on the display 65, as well as the control of the motor 162 and the brake 118.

Optional operations of the labeler 30 are controlled by software, hereinafter referred to as global subroutines, stored in a paged EPROM 216 of the EPROM 200 and a paged EPROM 218 of the EPROM 202 extending from addresses 8000 to C000. Optional operations controlled by the global subroutines stored in the EPROM 216 and 218 include, for example, the following: (1) gun configuring: (2) port configuring: (3) enable/disable date; (4) limiting the label count; (5) setting the scanner type; (6) on-line downloading/uploading of data; (7) selecting a currency symbol; (8) defining cost codes; (9) defining check digits; (10) selecting prompt language; (11) gun to gun transfers; (12) storing and forwarding data; (13) format initialization; (14) enabling formats; (15) configuring formats; and (16) automatic shut off.

The gun configuration operation (1) allows the labeler 30 to be reconfigured by the host computer 212 to enable or disable other optional operations. The port configuration operation (2) allows a user to select the baud rate, parity, block size, etc. of the interface 252 for communications with the host computer 212. The enable/disable date operation (3) enables or disables the display of the date. The limiting of the label count operation (4) allows a user to limit the number of labels of a particular type to be printed. The setting of the scanner type operation (5) allows the labeler to be used in conjunction with a scanning wand or the like to scan bar code data for entry into the labeler's RAM 204, 206. The on-line operation (6) allows the downloading of data from the host computer 212 into the RAMs 204 and 206. The selection of a currency symbol operation (7) allows a user to select the currency symbols used by various countries. The define cost code operation (8) and the define check digit operation (9), respectively, allow a user to define his own cost code and check digit routines. The selection of prompt language operation (10) allows a user to select the language, such as English, French, Spanish, etc., in which prompt messages are to be shown on the display 65. The gun to gun transfer operation (11) allows data to be transferred from the RAM of one labeler to the RAM of another labeler. The store and forward data operation (12) allows new data to be entered through the keyboard 72 for storage in the RAMs 204, 206. The format initialization operation (13) is executed on power up or during a cold start to automatically clear the unpaged portion 220 of the RAM 204. The enable format operation (14) allows a user to design new labels; whereas, the format configuration operation (15) defines the format of a label by specifying the field type such as price field or bar code field as well as by specifying the length of the label and horizontal and vertical starting points of the data to be printed on the label. The automatic shut-off operation (16) allows the microprocessor 74 to be automatically shut off if the labeler 30 is not used for an extended period of time so as to conserve power. These are only a few illustrative optional operations which may be controlled by the global subroutines stored in the EPROMS 216 and 218.

As shown in FIG. 4, the paged RAM of RAMs 204 and 206 extends from addresses 4000 to 8000 and forms format, image and data buffers. The format buffer in the paged RAM stores information defining the format of a label to be printed including the type of field, length, starting point, etc. The data buffer in the paged RAM stores the data to be printed on the label, such as the price or a particular bar code. The information stored in the image buffer of the paged RAM forms an image of what is to be printed on a label wherein the information stored in the image buffer is formed from the information stored in the format and data buffers. The paged RAM also stores new subroutines downloaded into the RAM from the host computer 212 to replace disabled global subroutines as discussed in detail below. The new subroutines downloaded into the paged RAM control new optional operations of the labeler 30. The paged RAM also stores various prompts which may be displayed on the display 65 to aid a user in entering data on the keyboard 72. Further, the paged RAM also stores the available fonts for the labeler 30. The unpaged portion 220 of the RAM 204 is used to store various variables used by the global subroutines stored in the EPROMs 216 and 218 as well as various miscellaneous information.

Although information may be downloaded to the RAMs 204 and 206 from the host computer 212 to alter the RAMs by software alone, the EPROMs 202 and 206 are nonalterable by software alone, that is, by the host computer 212 alone. More specifically, to alter the EPROMs 202 and 206, the labeler 30 must be disassembled, the EPROMs removed and erased by being passed through ultraviolet light and the EPROMs reprogrammed by a specialized programmer module. However, according to the present invention, the optional operations defined by the global subroutines stored in the EPROMs 216 and 218 may be enabled, disabled or replaced to reconfigure the labeler 30 by software alone using a master jump table depicted in FIG. 7.

The master jump table 224 is stored in the microprocessor's EEPROM 222 extending from addresses C800 to CFFF. The master jump table stores information identifying each subroutine defining an optional operation of the labeler 30 as enabled or disabled. In particular, for an enabled global subroutine, the information stored in the master jump table 224 represents the address and page number at which the global subroutine is stored in the paged EPROMs 216, 218 to identify the location of the routine in the EPROMs 216, 218. For a disabled global subroutine, the master jump table 224 stores a first disable flag in place of the address of the routine and a second disable flag in place of the page number of the routine. For a disabled routine that has been replaced, the master jump table 224 stores the address and page number at which the new subroutine, replacing the disabled subroutine, is stored in the paged RAM 204, 206 to identify the location of the new subroutine in the paged RAM.

When the labeler 30 is to perform an optional operation, the microprocessor 74 accesses the subroutine stored in the paged EPROM 216, 218 or the RAM 204, 206 using the master jump table 224. If the master jump table 224 stores for the subroutine the EPROM or RAM address and page number at which the subroutine is stored, the microprocessor 74 may execute the subroutine when it is called to thereby control the labeler 30 to perform the operation defined by the subroutine. If, however, the master jump table 224 stores a disable flag for the subroutine, the microprocessor 74 cannot access the subroutine since the microprocessor 74 will not know where the subroutine is stored. The labeler 30 is thus prevented from performing the optional operation defined by a disabled subroutine. By downloading a revised master jump table 224 from the host computer 212 through the interface 252 to the microprocessor's EEPROM, the labeler 30 may be reconfigured by software alone to perform optional operations previously disabled or to be prevented from performing optional operations previously enabled. Further, new subroutines downloaded into the RAM 204, 206 from the host computer 212 and addressed through the revised master jump table 224 may replace disabled subroutines.

Global subroutines stored in the EPROMs 216 and 218 or new subroutines stored in the RAM 204, 206 are accessed by the microprocessor 74 in accordance with a table handler routine, shown in FIG. 6, using the master jump table 224. The table handler routine may be called by a global subroutine or other software including a system configurator routine depicted in FIG. 5. As shown in FIG. 5, the microprocessor 74 under the control of the system configurator routine scans the inputs from the keyboard 72 at a block 230. At a block 232, the microprocessor 74 determines whether keys actuated in a sequence identify a global subroutine N. For example, a user might call a global subroutine No. 2 by actuating a first key labeled 8 and then a second key labeled 2 wherein the number 82 identifies the global subroutine No. 2. If the keys representing 8 and 2 are pressed in that order, the microprocessor 74 determines at block 232 that the second global subroutine has been called. Thereafter, at block 234 the microprocessor 74 jumps to the table handler subroutine depicted in FIG. 6.

As shown in FIG. 6, the microprocessor 74 operating in accordance with the table handler routine loads, at block 236, the Nth master jump table address into an internal register Y. For example, if the second global subroutine has been called as determined by the system configurator, the microprocessor at block 236 loads the second master jump table address, C803 as shown in the master jump table 224 into the register Y. At block 238, the microprocessor 74 determines whether the EPROM or RAM address stored in the jump table 224 at the Nth table address is valid. For the above example, the microprocessor 74 at block 238 determines whether an EPROM or RAM address and page number are stored at the second jump table address C803. If they are, the address is determined at block 238 to be valid and the second global subroutine enabled so that the microprocessor 74 proceeds to block 242. If, however, the microprocessor determines at block 238 that, at the second address C803, an invalid address is stored such as a default address flag, 0FFFFH and a default page number flag 0FFH, the second global subroutine is identified as disabled and the microprocessor 74 proceeds to block 240. At block 240, the microprocessor 74 returns to the subroutine which called the table handler, in this case the system configurator routine shown in FIG. 5.

If the address for the called global subroutine is valid so that the global subroutine is enabled as determined by the processor at block 238, the microprocessor 74 determines at block 242 whether the current EPROM or RAM page number is equal to the EPROM or RAM page number stored at the Nth address in the jump table 224. If it is not, the microprocessor proceeds to block 244 where it saves the current page number and switches to the new page number stored at the Nth address in the jump table 224. At block 246, the microprocessor 74 then performs a jump subroutine to the address stored at the Nth address in the master jump table 224 which, for the example of the second global routine, is the address stored at the second address, C803, in the table 224. Upon completing the execution of the global subroutine called, the microprocessor returns to block 248 and switches back to the page number saved at block 244. Thereafter, the microprocessor returns to the caller routine at block 240. If, the microprocessor 74 determines at block 242 that the current page number is equal to the page number stored at the Nth address in the master jump table 224, the microprocessor at block 250 performs a jump subroutine to the address stored at the Nth address in the master jump table 224. After executing the global subroutine, the microprocessor 74, at block 240, returns to the caller routine.

It is noted that the master jump table is a relatively large table. In order to increase the ease and efficiency of reconfiguring the labeler 30, subtables may be used in accordance with the present invention. A subtable is a table that is stored in the EEPROM 222 and is associated with at least one optional operation wherein the subtable identifies each of a plurality of features of the associated optional operation as enabled or disabled. The features listed in the subtables are optional in that they may be enabled, disabled or replaced by a host computer 212 coupled to the labeler 30 through the RS 232 interface in the same manner as an optional operation listed in the master jump table. The subtables are small compared to the master jump table so that they may be reconfigured more easily and efficiently. Further, the use of subtables increases the flexibility of the labeler 30 since not only may main operations (optional operations) be selectively enabled and disabled but individual suboperations (functions) of an enabled optional operation may be selectively enabled or disabled.

Each subtable is addressed by the software of its associated optional operation that is stored in the EPROM 200, that software being addressable by means of the master jump table. For example, one or more subtables may be associated with the select prompt language operation (10) wherein each subtable includes a list of languages that may be used to display prompt messages to the user on the display. For each enabled language listed, the subtable stores the address to the EPROM 200 or RAM 204 at which the software for the language is stored. When the select prompt language operation (10) is selected by a user and this operation is enabled, the microprocessor 74 in accordance with the table handler routine shown in FIG. 6 loads the master jump table address for the operation in register Y at block 236. Thereafter, at either block 246 or block 250, the microprocessor 74 performs a jump to the subroutine shown in FIG. 8 that is stored at the address identified in the master jump table for the select prompt language operation (10). The microprocessor 74 in accordance with the select prompt language subroutine shown in FIG. 8 first displays a request for the user to select a particular language associated with a prompt table at block 260. When the microprocessor 74 determines at block 262 that the user has selected a language, the microprocessor 74 at block 264 looks to the prompt table stored in the EEPROM 222 to determine whether the selected language is enabled or not. If the language is enabled, the microprocessor 74 at block 266 reads the address stored in the prompt table into the scratch pad portion of the RAM 204. Thereafter, the microprocessor 74 exits the subroutine at block 267. The prompt language subtables enable languages to be selectively enabled or disabled very quickly during the reconfiguration process without altering the master jump table.

One subtable may be used by more than one optional operation. For example, an on-line subtable 270 as shown in FIG. 10 is used by both the gun-to-gun transfer operation (11) and the on-line downloading/uploading operation (6) wherein the former operation allows the transfer of stored information between one reconfigurable labeler 30 and a second reconfigurable labeler while the latter operation enables information transfers between a reconfigurable labeler 30 and a host computer 212. When a user selects either the gun-to-gun transfer operation (11) or the on-line downloading/uploading operation (6), the microprocessor 74 in accordance with the table handler routine of FIG. 6 loads the master jump table address for the subroutine depicted in FIG. 9 into register Y at block 236 and at either block 246 or 250 performs a jump subroutine to that address. In accordance with the subroutine depicted in FIG. 9, the microprocessor at block 272 displays a request to the user to select an optional operation function from the on-line enable table 270. For example, the user may select download formats 271 if he wishes new format information to be downloaded to the labeler 30. When the user selects such an optional function is determined by the microprocessor 74 at block 274, the microprocessor determines at block 276 whether the selected function is enabled in the on-line table 270. If the selected function is not enabled, the microprocessor 74 returns to block 272. If, however, the selected function is enabled, the microprocessor 74 at block 278 reads the address identified in the on-line enable table 270 for the selected function into the scratch pad portion of RAM 204 and thereafter exits the subroutine at block 280. It is noted that the on-line subtable 270 may also be used with the scanner operation (5) wherein data is transferred to the labeler 30 via a scanning wand or the like.

In order to reconfigure the labeler 30, the microprocessor 74 is coupled to the host computer 212 through the RS 232 interface 252. A user then enters on the keyboard 72 the key sequence for the gun configuration operation (1) discussed above. In response to the key sequence associated with the gun configuration operation (1) before the initial handshake, the labeler 30 at block 284 (FIG. 11) determines whether the correct password has been entered on the keyboard 72 of the labeler 30 and if not the labeler 230 exits the gun configuring routine at block 286. If the correct password has been entered into the labeler 30, the microprocessor 74 causes a "WAITING" message to be shown on the display 65. Thereafter, the microprocessor 74 and the host computer 212 perform an initial handshake operation. The host computer 212 at block 288 first requests the memory size of the labeler 30 and in particular the page count which represents the size of the RAM 204. When the host computer 212 receives the page count from the labeler 30 as determined thereby at block 290, at block 292 the host computer compares the received page count to the page count that it expects to receive. If the expected page count is not received from the labeler as determined by the host computer 212 at block 294, at block 296 the host computer displays an error message on its display screen and exits the gun configuring routine at block 298. If the correct page count is received, the host computer 212 at block 300 requests the base level software i.e. the version of the software according to which the microprocessor 74 operates. After the base level of the software in the labeler 30 is received therefrom by the host computer 212 as determined at block 302, the host computer 212 compares the received base level of the software to the expected level of the software at a block 304. If the base level of the software that is received from the labeler 30 does not match the base level of the software that is expected as determined at block 306, the host computer 212 displays an error message on its display screen at block 307 and thereafter exits the gun configuring routine at block 309. If the base level of the software received from the labeler 30 matches that which was expected by the host computer 212, the host computer 212 requests the expansion version of the labeler 30 at block 308 wherein the expansion version identifies the software version of the expansion EPROM that the labeler 30 has, if any. When the expansion version is received from the labeler 30 as determined by the host computer 212 at block 310, the host computer 212 at block 312 compares the received expansion version to the expansion version that is expected by the host computer. If the two do not match, as determined by the host computer 212 at block 314, at block 316 the host computer 212 displays an error message on its display screen and thereafter at block 318 exits the gun configuring routine. If the received expansion version does match the expected expansion version, the host computer 212 at block 320 requests the configuration version of the labeler 30. When the configuration version of the labeler 30 is received therefrom as determined by the host computer 212 at block 322, the host computer 212 at block 324 compares the received information to the configuration version that is expected by the host computer 212. If the versions do not match as determined by the host computer 212 at block 326, the host computer at block 328 displays an error message on its display screen and thereafter at block 330 exits the gun configuring routine. If the configuration version does match the expected configuration version the host computer 212 at block 332 sends a message to the labeler 30 completing the initial handshake to which the microprocessor 74 responds by controlling the display 65 to display a message "COMMUNICATION ESTABLISHED". The handshake operation depicted in FIG. 10 forms a check to ensure that only the correct labeler is reconfigured and not another labeler that may have already been reconfigured or is incapable of being reconfigured as desired.

After communication is established between the labeler 30 and the host computer 212, the host computer may reconfigure the labeler 30 by merely downloading a new master jump table or subtable(s) at block 334 in accordance with one embodiment of the present invention or in accordance with a second embodiment as follows. If, for example, the enabled optional operations of the labeler 30 are to be changed, the host computer 212 may request the master jump table 224 from the microprocessor 74. In response thereto, the microprocessor 74 transfers the master jump table 224 to the host computer 212. The host computer 212 under the control of an operator may then enable a disabled global subroutine by replacing the address and page number disable flags in the master jump table 224 for the routine with the address and page number of the paged EPROM 216, 218 at which the routine is actually stored. To disable an enabled subroutine, the operator controls the host computer 212 to replace the address and page number of the EPROM 216, 218 at which the routine is stored with the address and page number disable flags. Further, the operator of the host computer 212 may replace a first global subroutine with a second global subroutine by changing the EPROM address and page number stored in the master jump table 224 for the first subroutine with the EPROM address and page number for the second subroutine. A disabled subroutine may also be replaced by a new subroutine by controlling the host computer 212 to download the new routine into the RAM 204, 206 and by replacing the address and page number disable flags for the disabled routine with the address and page number of the paged RAM 204, 206 at which the new routine is stored.

Figure 12:
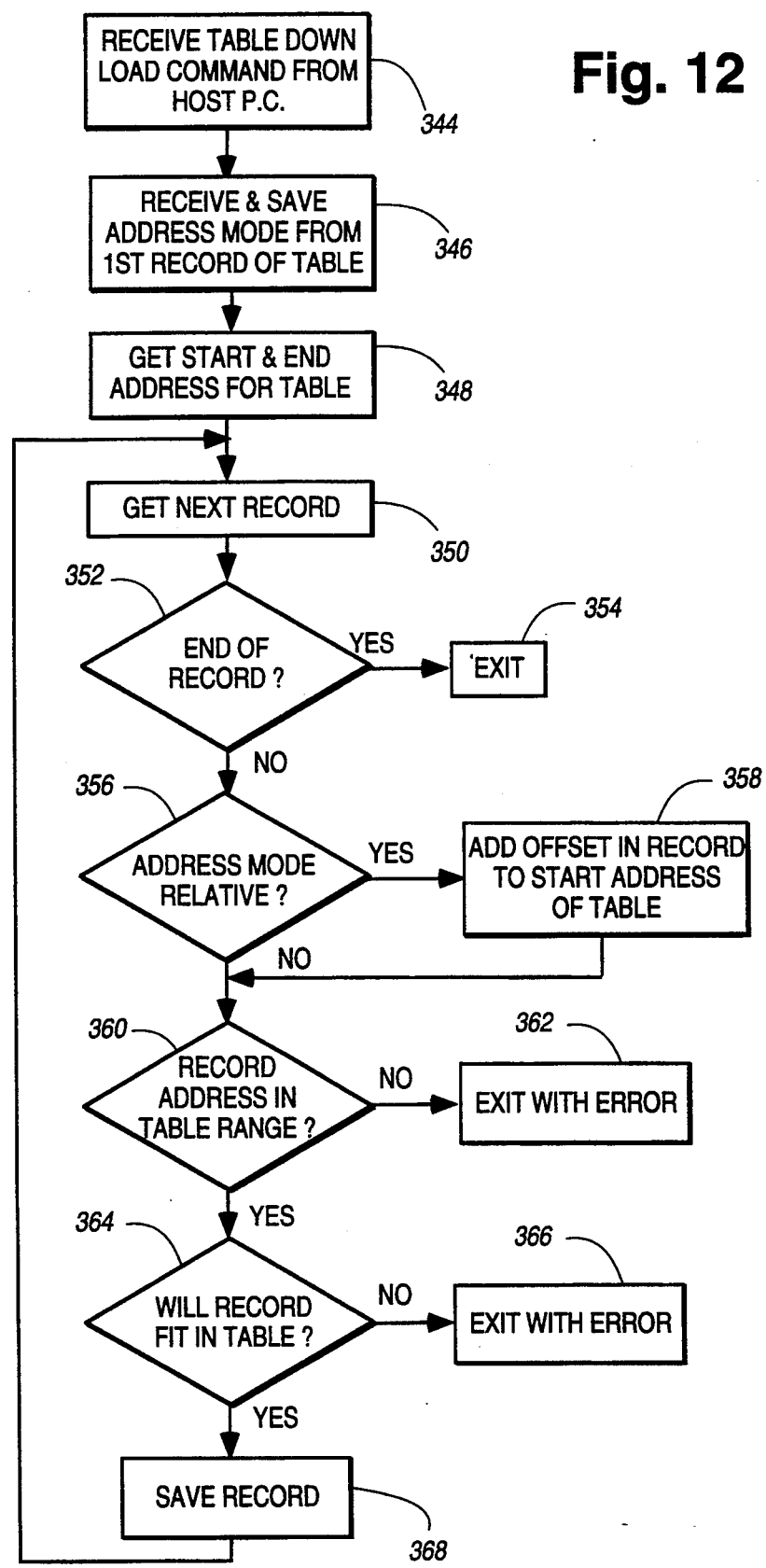
FIG. 12 is a flow chart illustrating a table boundary check routine.

After changing the master jump table 224, the host computer 212 downloads the new master jump table through the interface 252 to the labeler 30 as follows. With reference to FIG. 12, at block 344 the microprocessor 74 receives the table download command from the host computer 212. The microprocessor 74 at block 346 then receives and saves the first record in the table to be downloaded, the first record identifying the address mode of the table as absolute or relative addressing. If the address mode is absolute, each data record contains the exact address of where the data is to be placed in the labeler's memory. If the relative addressing mode is to be employed by the table, each data record contains an address offset to which the microprocessor 74 responds by offsetting the data record from the beginning of the table utilizing the offset contained in the data record. After receiving the address mode for the table at block 346, the microprocessor 74 at block 348 gets the start and end address for the table from the EPROM 200. Thereafter, at block 350, the microprocessor 74 gets the next record of the table. At block 352 the microprocessor 74 determines whether the record obtained at block 350 is the end of file record and if not determines at block 356 whether the address mode is relative or not. If the address mode is determined to be relative at block 356, the microprocessor 74 at block 358 adds the offset contained in the record to the start address of the table that was obtained at block 348. At block 360, the microprocessor 74 determines whether the record address contained in the data for the absolute address mode or as calculated at block 358 for the relative address mode is within the table range as determined from the end address obtained at block 348. If the record address is not within the table's range, the microprocessor 74 exits the routine at block 354 and provides an error indication which may be a message displayed on the display 65 or an audible indication such as a beep or the like that indicates to the user that the labeler 30 cannot accept the table that the host computer 212 is attempting to download thereto. If the record address is within the range of the table as determined by the microprocessor 74 at block 360, at block 364 the microprocessor 74 determines whether the record is of a size such that it will fit in the table. If the microprocessor determines that the record will not fit in the table the microprocessor at block 366 will exit the routine and provide an error indication as discussed above with reference to block 362. If, however, the record address is within the range of the table and the record will fit in the table, the microprocessor at block 368 saves the record in the EEPROM 222 and returns to block 350 to obtain the next record. This boundary check procedure is performed on each record of the table until the end of file record is received as determined by the microprocessor at block 352, at which point the microprocessor exits the routine at block 354. By executing the routine depicted in FIG. 11, the labeler 30 determines whether the host computer 212 is trying to store information in the wrong area of the EEPROM 222. This same procedure is implemented for other tables such as subtables also stored in the EEPROM 222 and may be implemented for tables stored in the RAM 204.

Figure 13:
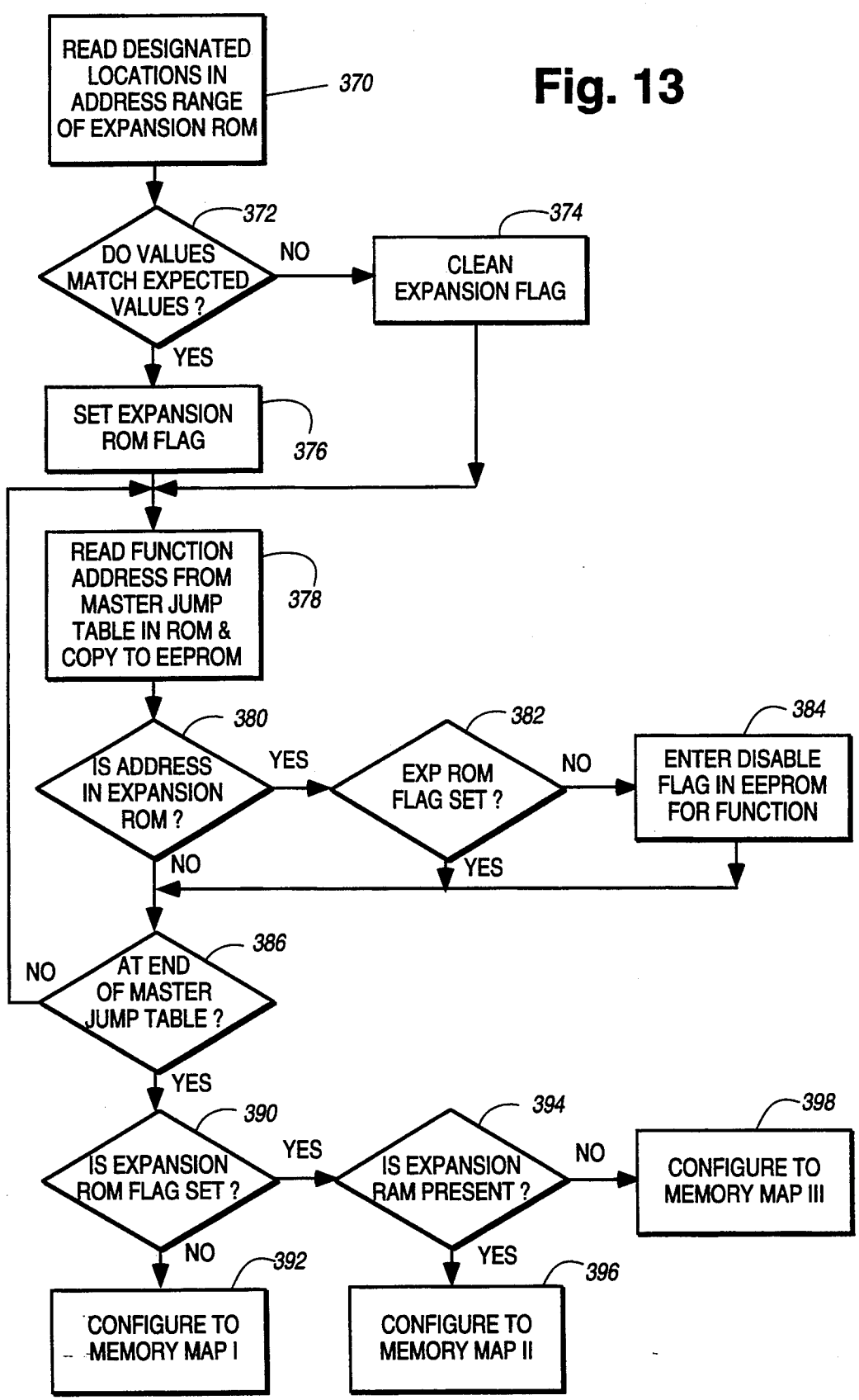
FIG. 13 is a flow chart illustrating memory configuration routine.

Another feature of the reconfigurable printer of the present invention that is implemented on the first powering up of the labeler is an automatic memory configuration operation that is depicted in FIG. 13. During the initial power up operation, default start diagnostics are first implemented by the microprocessor 74. Thereafter, the microprocessor 74 configures the memory of the labeler 30. More particularly, at block 370 the microprocessor 74 reads the designated locations in the address range of the expansion ROM 202 of the labeler 30. At block 372, the microprocessor 74 determines whether the values read match expected values. If so, the microprocessor 74 determines that the expansion ROM 202 is present and at block 376 sets the expansion ROM flag. If the microprocessor determines at block 372 that the expansion ROM 202 is not present since the read values do not match the expected values, the microprocessor 74 at block 374 clears the expansion ROM flag and proceeds to block 378. At block 378 the microprocessor 74 reads an address for an optional operation from the master jump table that is initially stored in the EPROM 200 and copies the read address into the EEPROM 222 at the appropriate location allocated for that operation in the master jump table. Thereafter, at block 380 the microprocessor 74 determines whether the address read at block 378 is in the expansion ROM 202 and if not, proceeds to block 386. If the address is in the expansion ROM 202, the microprocessor at block 382 determines whether the expansion ROM flag is set and if so goes to block 386. However, if the address is determined at block 380 to be in the expansion ROM, however, the expansion ROM flag is not set, at block 384 the microprocessor 74 replaces the address read for the optional operation at block 378 with the disable flag to prevent an optional operation, the software of which is not present in the labeler 30, from being addressed by a user. Thereafter, the microprocessor 74 at block 386 determines whether all of the entries in the master jump table have been read and if not, the microprocessor 74 increments a pointer to the next optional operation address in the master jump table stored in the EPROM and proceeds to block 368 to repeat the steps discussed above. After each of the addresses stored for the master jump table in the EPROM have been read and copied to the EEPROM 222, the microprocessor 74 at block 390 determines whether the expansion ROM flag was set and if not, the microprocessor 74 at block 392 configures the labeler 30 to a memory map I configuration which indicates that neither the expansion EPROM 202 or the expansion EPROM 206 is present in the labeler. If the microprocessor 74 determines at block 390 that the expansion ROM flag is set but determines at block 394 that the expansion RAM 206 is not present, the microprocessor 74 at block 396 configures the labeler 30 to a memory map II configuration indicating that the expansion EPROM 202 is present but that the expansion RAM is 206 is not present. If the microprocessor 74 determines that the expansion ROM flag is set and that the expansion RAM is present, at block 382 the microprocessor configures the labeler 30 to a memory map III configuration indicating that both the expansion EPROM 202 and the expansion RAM 206 are present. The configurations set by the microprocessor at blocks 384, 386 and 382 define the size of the format and image buffers as well as the size of the on-line data buffer. For example, a memory map I configuration does not have an on-line data buffer whereas a memory map II configuration has a small on-line data buffer and a memory map III configuration has a large on-line data buffer.

It is noted that the reconfigurable labeler 30 may be made fixed, fully configurable or semi-fixed by selectively enabling and disabling particular optional operations of the labeler. More particularly, to provide a fully configurable labeler 30, the format initialization operation (13) as well as the enabled format operation (14) are both enabled so that a user has the maximum flexibility in creating his own format at any time within the limits of the particular labeler 30 employed. To provide a fully configurable labeler, the format initialization operation (13) as well as the enable format operation (14) are both enabled so that upon a cold start, the format information and data stored in the RAM 204 will be automatically cleared. To provide a fixed format labeler, the format initialization (13) as well as the enable format operation (14) are disabled so that only formats initially programmed into the labeler 30 are available to a user. These formats cannot be disabled nor can they be eliminated during a cold start procedure. Finally, a soft fixed labeler 30 may be provided by disabling the format initialization operation (13) and enabling the format operation (14) so that formats may be edited. However, the formats are protected in that they cannot be automatically eliminated during a cold start.

The labeler 30 may be reconfigured with a new master jump table or new subtables by software alone without necessitating the disassembly of the labeler 30 so that reconfiguration operation can be accomplished in a relatively short amount of time and at a much lower cost than has heretofore been possible. During the reconfiguration operation checks are made by the host computer to insure that the correct labeler is reconfigured and by the labeler itself to insure that the host computer does not try to store information in the wrong area of the labeler's memory. These checks can save considerable time and prevent costly mistakes from occurring during the reconfiguration operation. Further, by selectively enabling or disabling certain optional operations the labeler may be made fully configurable, fixed as to formats and the like or semi-fixed so that one unit may be formed into a number of different types of labelers.

Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A reconfigurable printer for printing on a web of record members, said reconfigurable printer being interfaceable with an auxiliary device for downloading information from said auxiliary device to said printer to reconfigure said printer comprising:
   first means for storing software routines defining optional operations of said printer at addressable locations, said first storing means being non-alterable by the downloading of information to said printer;
   second means for storing information identifying each optional operation software routine as enabled or disabled, said information for each enabled optional operation software routine identifying the addressable location at which the routine is located in said first memory means and said second storing means being alterable by the downloading of new information to said printer; and
   processing means for controlling the operations of said printer in accordance with a plurality of software routines, said processing means operating in accordance with an enabled optional operation software routine by addressing said enabled routine in said first storing means with the information stored in said routine in said second storing means.

2. A reconfigurable printer for printing on a web of record members as recited in claim 1 wherein said second storing means includes a first table in which said information identifying each optional operation as enabled or disabled is stored and said second storing means includes a plurality of subtables, each subtable being associated with at least one of said optional operations and storing information identifying each of a plurality of features of said associated optional operation as enabled or disabled to allow features of said associated optional operation to be selectively altered.

3. A reconfigurable printer for printing on a web of record members as recited in claim 2 wherein at least one of said subtables is associated with a plurality of optional operations.

4. A reconfigurable printer for printing on a web of record members as recited in claim 2 wherein the software routine stored in said first memory for an optional operation having an associated subtable, utilizes the subtable to determine whether a feature of the optional operation is enabled and if said feature is enabled said subtable identifies the addressable location at which the software routine defining the feature is stored.

5. A reconfigurable printer as recited in claim 2 further including a display for providing a message to an user; and input means operable by said user for selecting an optional operation, one of said optional operations allowing said user to select a language in which said message is to be displayed and a subtable associated with said one optional operation storing information identifying each of a plurality of languages as enabled or disabled.

6. A reconfigurable printer as recited in claim 2 further including input means operable by said user for selecting an optional operation; a data memory storing a plurality of data; and means for interfacing with said processing means and an auxiliary device to allow the transferring of information between said printer and said auxiliary device, one of said optional operations allowing a user to transfer information between said printer and said auxiliary device and a subtable associated with said one optional operation storing information identifying a transfer operation for particular data stored in said data memory as enabled or disabled.

7. A reconfigurable printer as recited in claim 6 wherein said auxiliary device is a host computer.

8. A reconfigurable printer as recited in claim 6 wherein said auxiliary device is a second reconfigurable printer.

9. A reconfigurable printer for printing on a web of record members as recited in claim 1 wherein said first storing means includes a read only memory having a plurality of numbered pages and said information stored in said second storing means for enabled optional operation software routines including the page number and address at which each of said enabled routines is located.

10. A reconfigurable printer for printing on a web of record members as recited in claim 9 wherein the information stored in said second storing means for disabled optional operation software routines includes a first flag and a second flag in place of the page number and address at which each of said disabled routines is located.

11. A reconfigurable printer for printing on a web of record members, said reconfigurable printer being interfaceable with an auxiliary device for downloading information from said auxiliary device to said printer to reconfigure said printer comprising:
  input means operable by a user for selecting one of a plurality of optional operations of said printer;
  first means for storing software routines defining optional operations of said printer at addressable locations, said first storing means being non-alterable by the downloading of information to said printer;
  second means for storing information identifying each optional operation software routine as enabled or disabled, said information for each enabled optional operation software routine identifying the addressable location at which the routine is located in said first storage memory and said second storing means being alterable by the downloading of new information to said printer; and
  processing means responsive to said input means for controlling the operation of said printer in accordance with a plurality of software routines, said processing means operating in accordance with a memory handler routine to access a selected, optional operation software routine stored in said first storing means by accessing the information stored in said second storing means for said optional operation software routine.

12. A reconfigurable printer for printing on a web of record members as recited in claim 11 wherein said first storing means is nonalterable by software alone and said second storing means is alterable by software alone.

13. A reconfigurable printer for printing on a web of record members as recited in claim 12 wherein said first storing means includes an EPROM having numbered pages and said information stored in said second storing means for an enabled optional operation software routine includes the page number and address of the EPROM location at which said routine is stored.

14. A reconfigurable printer for printing on a web of record members as recited in claim 12 wherein said memory handler routine is stored in a memory that is non-alterable by the downloading of information to said printer.

15. A reconfigurable printer for printing on a web of record members as recited in claim 12 wherein said first storing means includes an EPROM and said second storing means includes an EEPROM.

16. A reconfigurable printer for printing on a web of record members as recited in claim 11 wherein said first storing means includes a read only memory having a plurality of numbered pages and said information stored in said second storing means for an enabled optional operation software routine includes the page number and address at which said enabled routine is located.

17. A reconfigurable printer for printing on a web of record members as recited in claim 16 wherein the information stored in said second storing means for a disabled optional operation software routine includes a first flag and a second flag in place of the page number and address at which said disabled routine is located.

18. A reconfigurable printer for printing on a web of record members as recited in claim 11 wherein the information stored in said second storing means for each disabled routine includes a disable flag to prevent the accessing of each of said disabled routines by said processing means.

19. A reconfigurable printer for printing on a web of record members, said printer being interfaceable with a host processing means for downloading new information to said printer comprising:
  input means operable by an user for selecting one of a plurality of optional operations of said printer;
  first means for storing software routines defining optional operations of said printer at addressable locations;
  second means for storing information identifying each optional operation software routine as enabled or disabled, said information for each enabled optional operation software routine identifying the addressable location at which the routine is located in said first storing means;
  printer processing means responsive to said input means for controlling the operation of said printer in accordance with selected optional operation routines stored in said first storing means and identified as enabled in said second storing means; and
  means for interfacing with said printer processing means to allow the downloading of new information from said host processing means to said printer for storage in said second storing means to enable a disabled optional operation software routine and to disable an enabled optional operation software routine.

20. A reconfigurable printer for printing on a web of record members as recited in claim 19 wherein said first storing means is non-alterable by the downloading of information to said printer and said second storing means is alterable by the downloading of information to said printer.

21. A reconfigurable printer as recited in claim 19 further including a memory for storing a plurality of information including new information downloaded from said host processing means and representing a new optional operation software routine, said printer processing means storing said new optional operation software routine at an addressable location in said memory wherein said second storing means stores information identifying the location of said new optional operation software routine in said memory if said new optional operation software routine is enabled.

22. A reconfigurable printer as recited in claim 21 further including means for receiving new information prior to storage of said new information and means for determining whether said host processing means is attempting to store said new information in an improper location of said printer.

23. A reconfigurable printer as recited in claim 21 wherein at least one of said second storing means and said memory is expandable and said printer includes means for automatically allocating portions of said memory for a plurality of buffers.

24. A reconfigurable printer as recited in claim 23 wherein one of the said buffers forms a data buffer.

25. A reconfigurable printer as recited in claim 23 wherein one of said buffers forms a format buffer.

26. A reconfigurable printer as recited in claim 23 wherein one of said buffers forms an image buffer.

27. A reconfigurable printer as recited in claim 19 wherein said printer includes a data memory and operates in part in accordance with base software, said printer having a personality defined at least in part by the size of said data memory and the type of said base software and including means for transferring to said host processing means information representing the personality of said printer prior to the downloading of said new information.

28. A reconfigurable printer as recited in claim 27 wherein said personality is further defined by the size of said first storing means.

29. A reconfigurable printer as recited in claim 27 wherein said printer has a configuration version associated therewith, said configuration version being changeable when new information is downloaded to said printer and said personality is further defined by the configuration version of said printer.

30. A reconfigurable printer as recited in claim 27 wherein said host processing means includes means for storing data representing the expected personality of said printer and means for comparing said expected personality data and said transferred information representing the personality of said printer to determine whether said expected personality data and said transferred personality information match.

31. A reconfigurable printer as recited in claim 30 wherein said host processing means includes means for indicating that said transferred personality information does not match said expected personality data.

32. A reconfigurable printer as recited in claim 31 wherein said indicating means includes means for displaying a message.

33. A reconfigurable printer for printing on a web of record members as recited in claim 19 wherein said first storing means includes an EPROM having numbered pages and said information stored in said second storing means for an enabled optional operation software routine includes the page number and address of the EPROM location at which said routine is stored.

34. A reconfigurable printer for printing on a web of record members as recited in claim 19 wherein said first storing means includes a read only memory having a plurality of numbered pages and said information stored in said second storing means for enabled optional operation software routines includes the page number and address at which each of said enabled routines is located.

35. A reconfigurable printer for printing on a web of record members as recited in claim 34 wherein the information stored in said second storing means for disabled optional operation software routine includes a first flag and a second flag in place of the page number and address at which each of said disabled routines is located.

36. A reconfigurable printer for printing on a web of record members as recited in claim 19 further including a third means alterable by software alone for storing at addressable locations software routines downloaded through said interfacing means to replace a disabled optional operation software routine, said second storing means storing information identifying the addressable location at which the downloaded routine is located in said third storage means.

37. A reconfigurable printer for printing on a web of record members as recited in claim 19 wherein the information stored in said second storing means for each disabled routines includes a disable flag and further including means for controlling said processing means to respond to the selection of an optional operation software routine for which a disable flag is stored in said second storing means without accessing the routine stored in said first storing means.

38. A reconfigurable printer for printing on a web of record members as recited in claim 37 wherein said control means includes a memory handler routine stored in a memory that is nonalterable by software alone.

39. A reconfigurable for printing on a web of record members as recited in claim 38 wherein said memory for storing said memory handler routine is an EPROM.

* * * * *

UNITED STATES PATENT AND TRADEMARK OFFICE
CERTIFICATE OF CORRECTION

PATENT NO. : 5,402,528
DATED : March 28, 1995
INVENTOR(S) : Christopher, et al

It is certified that error appears in the above-indentified patent and that said Letters Patent is hereby corrected as shown below:

Column 10, line 10, delete "labeler 230" and insert -- labeler 30 -- therefore.

IN THE CLAIMS:

Claim 1, column 14, line 45, delete "stored in" and insert -- stored for -- therefore.

Claim 22, column 17, line 20, delete "prier" and insert -- prior -- therefore.

Signed and Sealed this

Seventeenth Day of September, 1996

Attest:

BRUCE LEHMAN

*Attesting Officer*     *Commissioner of Patents and Trademarks*